(12) United States Patent
Kawano et al.

(10) Patent No.: US 8,704,420 B2
(45) Date of Patent: Apr. 22, 2014

(54) STATOR FOR ELECTRIC MACHINE

(75) Inventors: Hiroshi Kawano, Kariya (JP); Hirohito Hayashi, Kariya (JP); Satoru Baba, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 382 days.

(21) Appl. No.: 13/256,679

(22) PCT Filed: Mar. 30, 2010

(86) PCT No.: PCT/JP2010/055736
§ 371 (c)(1),
(2), (4) Date: Sep. 15, 2011

(87) PCT Pub. No.: WO2010/116928
PCT Pub. Date: Oct. 14, 2010

(65) Prior Publication Data
US 2012/0001513 A1 Jan. 5, 2012

(30) Foreign Application Priority Data
Apr. 9, 2009 (JP) ................................. 2009-095158

(51) Int. Cl.
*H02K 3/04* (2006.01)
*H02K 1/18* (2006.01)
*H02K 15/085* (2006.01)

(52) U.S. Cl.
USPC .................... 310/179; 310/184; 310/216.079; 310/216.088; 310/208

(58) Field of Classification Search
USPC .......... 310/180, 184–185, 201, 208, 216.074, 310/216.079, 216.086, 216.088, 216.098
See application file for complete search history.

(56) References Cited

U.S. PATENT DOCUMENTS 3,495,114 A * 2/1970 Kazansky ..................... 310/179
5,886,444 A * 3/1999 Enomoto et al. .............. 310/208

(Continued)

FOREIGN PATENT DOCUMENTS

| JP | 06-261475 | | 9/1994 |
| JP | 10-146030 | * | 5/1998 |

(Continued)

OTHER PUBLICATIONS

International Preliminary Report on Patentability for PCT/JP2010/055736.

*Primary Examiner* — Burton Mullins
(74) *Attorney, Agent, or Firm* — Greenblum & Bernstein P.L.C.

(57) ABSTRACT

Disclosed is a stator for an electric machine. The stator is provided with a stator core, and first and second series of coils each formed into a predetermined shape. Each of the coils in the first series is provided with a pair of first coil ends which respectively protrude from both end faces of the stator core. Each of the first coil ends is provided with a pair of bent portions which extend outward in the radial direction of the stator, and a bridge portion which connects the bent portions. Each second coil end is provided with a pair of upright portions and a bridge portion which connects the upright portions. The bridge portions of the coils in the first series are disposed outside the bridge portions of the coils in the second series in the radial direction of the stator. The bridge portion of each of the coils in the second series extends across the bent portions of two adjacent coils in the first series. The coils in the first series and the coils in the second series are configured so that each series includes a mixture of coils of at least two phases among a U-phase, a V-phase, and a W-phase. Each of the coils in the first series is connected to a coil of the same phase in the second series.

8 Claims, 8 Drawing Sheets

(56) References Cited

U.S. PATENT DOCUMENTS

| | | | |
|---|---|---|---|
| 6,229,241 | B1 | 5/2001 | Ishigami et al. |
| 7,247,967 | B2 * | 7/2007 | Ionel et al. ............. 310/216.086 |
| 7,732,969 | B2 * | 6/2010 | Ishizeki et al. ................ 310/194 |
| 7,884,520 | B2 * | 2/2011 | Ishida et al. ........... 310/216.079 |
| 2003/0011253 | A1 | 1/2003 | Kalsi et al. |
| 2005/0110357 | A1 * | 5/2005 | Fukasaku et al. ............. 310/179 |
| 2010/0045134 | A1 * | 2/2010 | Ciampolini et al. .......... 310/201 |
| 2010/0225193 | A1 * | 9/2010 | Clark ........................... 310/208 |
| 2011/0291423 | A1 * | 12/2011 | Germishuizen et al. ........ 290/55 |

FOREIGN PATENT DOCUMENTS

| | | | |
|---|---|---|---|
| JP | 10-271733 | | 10/1998 |
| JP | 2002-125340 | * | 4/2002 |
| JP | 2003-507994 | | 2/2003 |
| JP | 2005-348461 | | 12/2005 |
| JP | 2006-238687 | | 9/2006 |
| JP | 2007-274801 | * | 10/2007 |
| JP | 2007-329985 | | 12/2007 |
| JP | 2009-189078 | * | 8/2009 |
| JP | 2010-136537 | * | 6/2010 |
| WO | 01/13496 | | 2/2001 |

\* cited by examiner

STATOR FOR ELECTRIC MACHINE

FIELD OF THE INVENTION

The present invention relates to a stator for an electric machine including a first and second series of coils each formed into a predetermined shape.

BACKGROUND OF THE INVENTION

As an electric machine in which U-phase, V-phase and W-phase coils are wound around teeth of a stator core in a distributed winding manner, there is a motor described in Patent Document 1 (Japanese Laid Open Patent Publication No. 10-271733). In the motor described in the Patent Document 1, when coils of the phases are assembled into slots, in order to avoid contact between coil ends of the coils of different phases, the coil ends are previously formed into predetermined shapes. By forming the coil ends into the predetermined shapes, the coil is prevented from being damaged when the coil is assembled into the slot using an inserter, the space factor of the coil is enhanced, and there is no need to form the coil end after the coil is assembled into the slot.

According to the motor described in the Patent Document 1, in a state where the U-phase coil is assembled into the slot, a coil end of the U-phase coil is formed so that slots into which the V-phase coil and the W-phase coil are assembled thereafter can be seen from an axial direction of a stator. That is, the coil end of the U-phase coil is formed such that a bridge portion thereof extends in an arcuate shape and radially outward of the stator core as compared with slots into which the V-phase coil and the W-phase coil are assembled. The coil end of the V-phase coil is formed to incline radially outward of the stator core from a location slightly separated away from an end surface of the stator core in its axial direction. The V-phase coil is disposed on the U-phase coil in a state where the V-phase coil is assembled into the slot. The coil end of the W-phase coil is formed into such a shape that the coil end stays within a region other than portions where the U-phase coil and the V-phase coil are disposed. A bridge portion of the coil end of the W-phase coil is formed such that it is disposed radially inside a bridge portion of the coil end of the V-phase coil in the stator core.

SUMMARY OF THE INVENTION

Problem to be Solved by the Invention

In the motor disclosed in Patent Document 1, in order to avoid contact between the coil ends of coils of the three phases (U-phase, V-phase and W-phase), the coil ends of the coils of the phases are formed into different shapes. Therefore, the shapes of the coil ends of coils of the phases are significantly complex. Hence, in the motor described in Patent Document 1, it is necessary to produce coils of respective phases using different spools, and in order to avoid the contact between the coil ends, it is necessary to precisely set bending angles for the coil ends and this largely increases production costs for the stator.

It is an objective of the present invention to provide a stator in an electric machine capable of avoiding contact between coil ends of coils of three phases, and capable of reducing production costs for a distributed wound stator.

To achieve the foregoing objective and in accordance with one aspect of the present invention, a stator for an electric machine is provided. The stator includes a stator core, a plurality of teeth, a first series of coils, and a second series of coils. The teeth extend into a first direction from the stator core and are arranged such that a slot is formed between adjacent teeth. The first series of coils are assembled into the slots and are formed into predetermined shapes. The second series of coils are assembled into the slots and are formed into predetermined shapes. Each of the first series of coils includes a pair of inserting portions respectively inserted into the slots, and a pair of first coil ends protruding from both end surfaces of the stator core. Each of the first coil ends includes a pair of bent portions extending from ends of the pair of inserting portions into a second direction that is opposite to the first direction, and a bridge portion that connects the bent portions with each other. Each of the second series of coils includes a pair of inserting portions respectively inserted into the slots, and second coil ends protruding from both end surfaces of the stator core. Each of the second coil ends includes a pair of upright portions extending from ends of the pair of inserting portions, and a bridge portion that connects the upright portions with each other. The bridge portions of the first series of coils are disposed on the side toward the second direction with respect to the bridge portions of the second series of coils. The bridge portions of the second series of coils each extend across the bent portions of two adjacent first series of coils. The first series of coils and the second series of coils are configured so that each series includes a mixture of coils of at least two phases among a U-phase, a V-phase and a W-phase, and each of the coils in the first series is connected to a coil of the same phase in the second series.

DETAILED DESCRIPTION OF THE PREFERRED EMBODIMENTS

A stator of an electric machine according to one embodiment of the present invention will be described below with reference to FIGS. 1 to 7.

Figure 1:
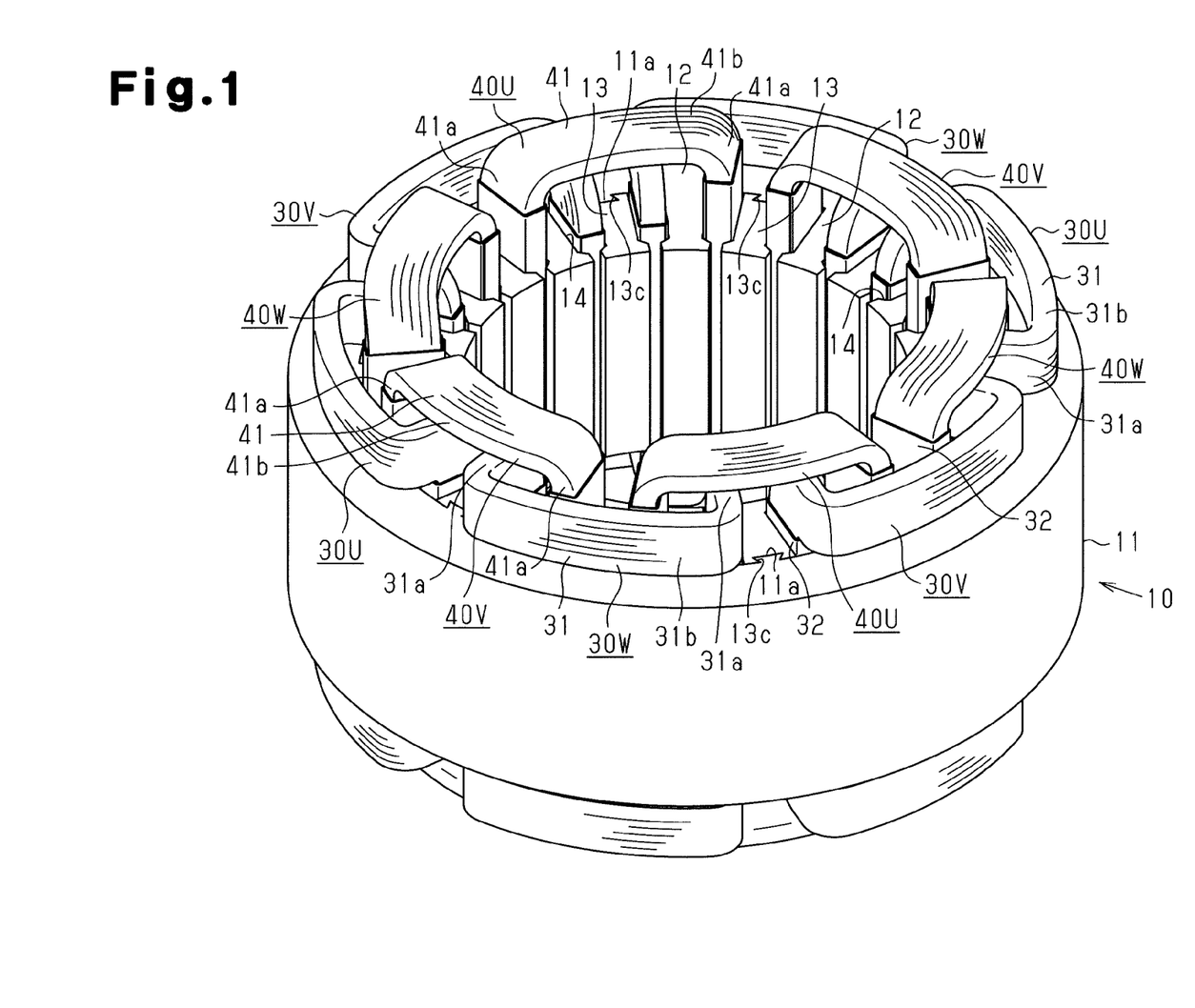
FIG. 1 is a perspective view showing a stator according to one embodiment of the present invention.
Figure 2:
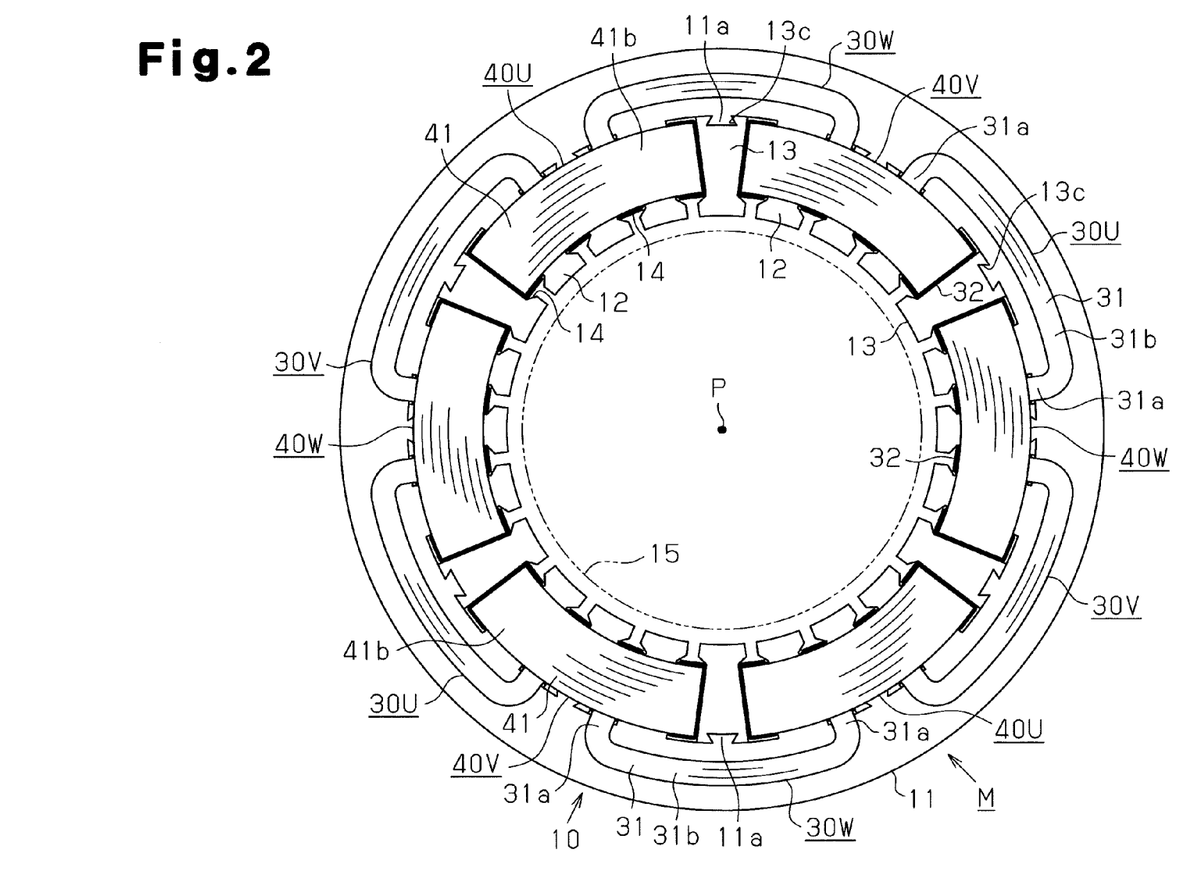
FIG. 2 is a plan view showing the stator shown in FIG. 1.

As shown in FIG. 2, a rotational electric machine M as an electric machine includes a stator 10 and a rotor 15 as a movable element that is rotatably mounted inside of the stator 10. As shown in FIGS. 1 and 2, the stator 10 includes an annular stator core 11, a plurality of stationary teeth 12, and a plurality of split teeth 13, which are arranged along a circumferential direction and radially inside the stator core 11, U-phase, V-phase and W-phase outer coils 30U, 30V and 30W as first series of coils, and U-phase, V-phase and W-phase inner coils 40U, 40V and 40W as second series of coils, which are assembled into slots. In this embodiment, the number of the stationary teeth 12 is twelve, the number of the split teeth 13 is twelve, and the number of slots 14 is twenty-four24. The slots 14 are arranged along a circumferential direction of the stator core 11 at equal pitch.

Figure 3A:
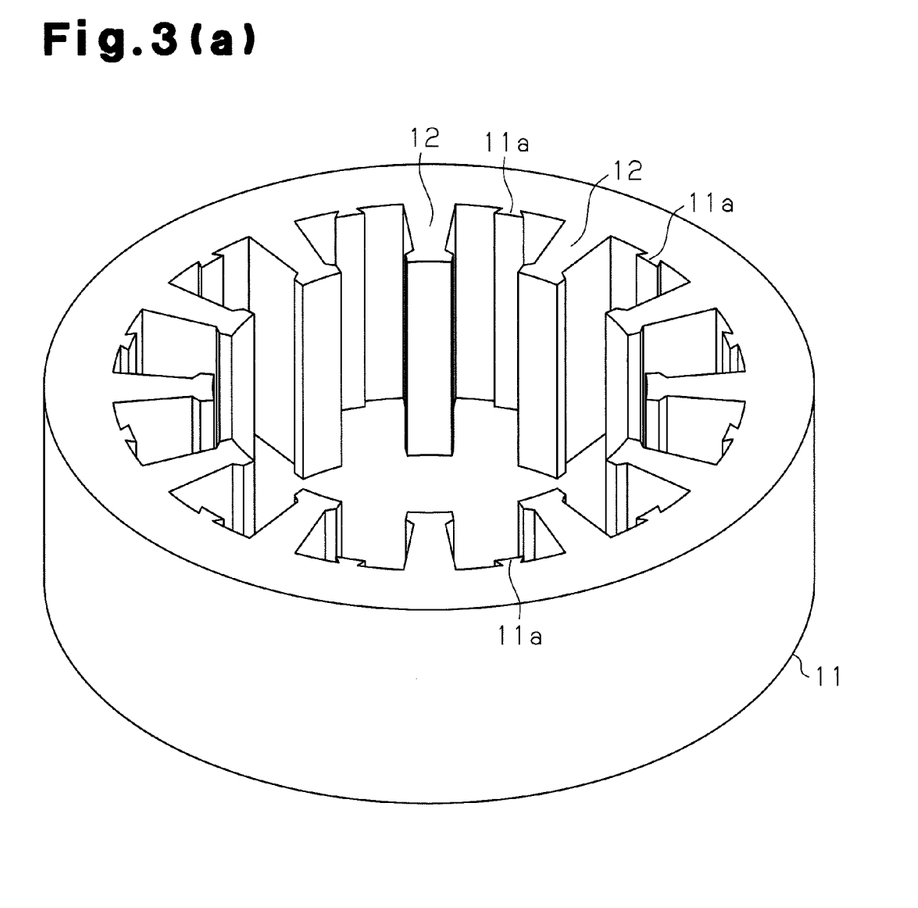
FIG. 3(a) is a perspective view showing a stator core.

The stator core 11 is configured by laminating a plurality of core plates made of magnetic material (steel plates) on one another in an axial direction. As shown in FIGS. 2 and 3(*a*), the plurality of stationary teeth 12 are integrally formed on an inner circumferential surface of the stator core 11. The stationary teeth 12 extend radially inward of the stator core 11, i.e., in a first direction toward a center axis P of the stator core 11 from the inner circumferential surface of the stator core 11. The stationary teeth 12 extend over the entire axial direction of the stator core 11.

Engaging projections 11*a* are formed at intermediate locations between stationary teeth 12 that are adjacent to each other in the circumferential direction of the stator core 11 on the inner circumferential surface of the stator core 11 such that the engaging projections 11*a* extend over the entire axial direction of the stator core 11. The engaging projections 11*a* are formed in a tapered shape such that their widths are gradually increased toward the center axis P (central portion) of the stator core 11 from the inner circumferential surface of the stator core 11.

Figure 3B:
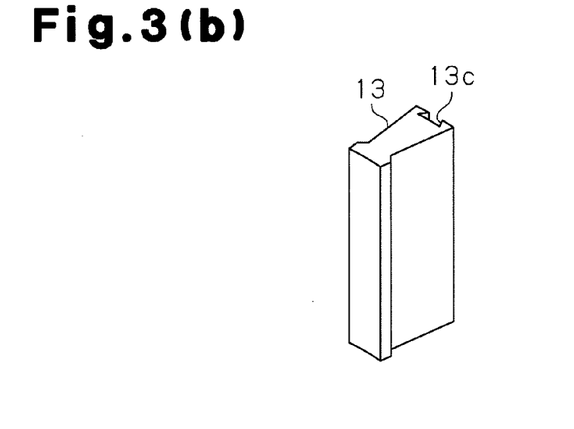
FIG. 3(b) is a perspective view showing a split tooth.

As shown in FIGS. 1 and 2, the split teeth 13 are attached between the stationary teeth 12 that are adjacent to each other in the circumferential direction of the stator core 11, at positions radially inside the stator core 11. As shown in FIG. 3(*b*), each of the split teeth 13 has a rectangular plate shape and its longitudinal size (size along the axial direction of the stator core 11) is the same as the size of the stator core 11 in its axial direction. An engaging recess 13*c* is formed on a proximal end surface of each of the split teeth 13 so as to extend over the entire split teeth 13 in its longitudinal direction. The engaging recess 13*c* is formed in a tapered shape such that its width is gradually increased toward its distal end surface from the proximal end surface of the split tooth 13.

As shown in FIGS. 1 and 2, the engaging projections 11*a* of the stator core 11 are fitted into the engaging recesses 13*c* of the split teeth 13, thereby attaching the split teeth 13 to the stator core 11. In this attached state, the engaging projections 11*a* are engaged with the engaging recesses 13*c*, thereby preventing the split teeth 13 from moving radially inward of the stator core 11. The split teeth 13 are attached to the stator core 11, thereby defining the slots 14 between the stationary teeth 12 and the split teeth 13 that are adjacent to each other in the circumferential direction of the stator core 11. Each of the slots 14 has a rectangular shape as viewed from above.

The U-phase, V-phase and W-phase outer coils 30U, 30V and 30W are wound around the stationary teeth 12 in the distributed winding manner. There are pairs for the U-phase, V-phase and W-phase outer coils 30U, 30V and 30W. All of the outer coils 30U, 30V and 30W are disposed on one circumference around the center axis P of the stator core 11. Each of the outer coils 30U, 30V and 30W is assembled into two stationary teeth 12 so as to extend across two slots 14 and two stationary teeth 12 while sandwiching one split tooth 13 therebetween. Coils of different phases are not inserted into the same slot 14.

Figure 4A:
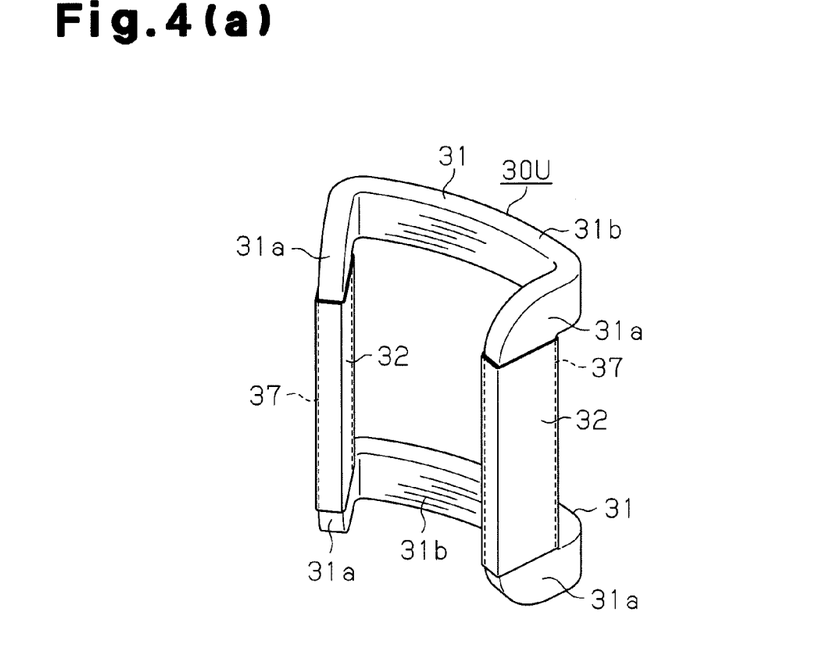
FIG. 4(a) is a perspective view showing an outer coil.

The pair of outer coils 30U is disposed at an angular distance of 180° from each other, and is inserted into a total of four slots 14. Eight slots 14 exist between a slot 14 into which one of the outer coils 30U is inserted and a slot 14 into which the other outer coil 30U is inserted. The outer coils 30V and the outer coils 30W are disposed also in the same manner. The outer coils 30U, 30V and 30W are coil wires (rectangular wires) having rectangular cross sections and uniform widths, and they are insulated and coated. As shown in FIG. 4(*a*), each of the outer coils 30U, 30V and 30W (only outer coil 30U is shown in FIG. 4(*a*)) includes a pair of inserting portions 37 inserted into the slots 14, and a pair of coil ends 31 (first coil ends) protruding from both end surfaces of the stator core 11 in its axial direction.

As shown in FIGS. 1 and 2, the coil end 31 of each of the outer coils 30U, 30V and 30W (hereinafter, referred to as an outer coil end 31) includes a pair of bent portions 31*a*, which are bent so as to extend radially outward of the stator core 11 (second direction opposite to the first direction) from the inserting portions 37. Further, each of the outer coil ends 31 includes an outer bridge portion 31*b*, which extends along the circumferential direction of the stator core 11 so as to connect distal ends of the pair of bent portions 31*a* with each other. Each of the outer coil ends 31 is formed by the pair of bent portions 31*a* and the outer bridge portions 31*b* into a channel shape as viewed from above. In each of the outer coils 30U, 30V and 30W, the outer bridge portions 31*b* are formed into predetermined shapes so as to extend along the circumferential direction of the stator core 11. The outer bridge portion 31*b* is disposed radially outside the inner circumferential surface (this corresponds to a bottom of the slot 14) of the stator core 11 in the stator core 11. When the inserting portion 37 is assembled into the slots 14, portions that protrude outward from both end surfaces of the stator core 11 in the axial direction are the outer coil ends 31. As shown in FIG. 4(*a*), an insulation sheet 32 made of synthetic resin is wound around each of the inserting portions 37.

The U-phase, V-phase and W-phase inner coils 40U, 40V and 40W as the second series of coils are wound around the stationary teeth 12 in the distributed winding manner. There are pairs of inner coils 40U, 40V and 40W. All of the inner coils 40U, 40V and 40W are disposed to be located on one circumference around the center axis P of the stator core 11. Each of the inner coils 40U, 40V and 40W is assembled into the two stationary teeth 12 so as to extend across two slots 14 and two stationary teeth 12 that sandwich one split tooth 13 therebetween. Coils of different phases are not inserted into the same slot 14.

Figure 4B:
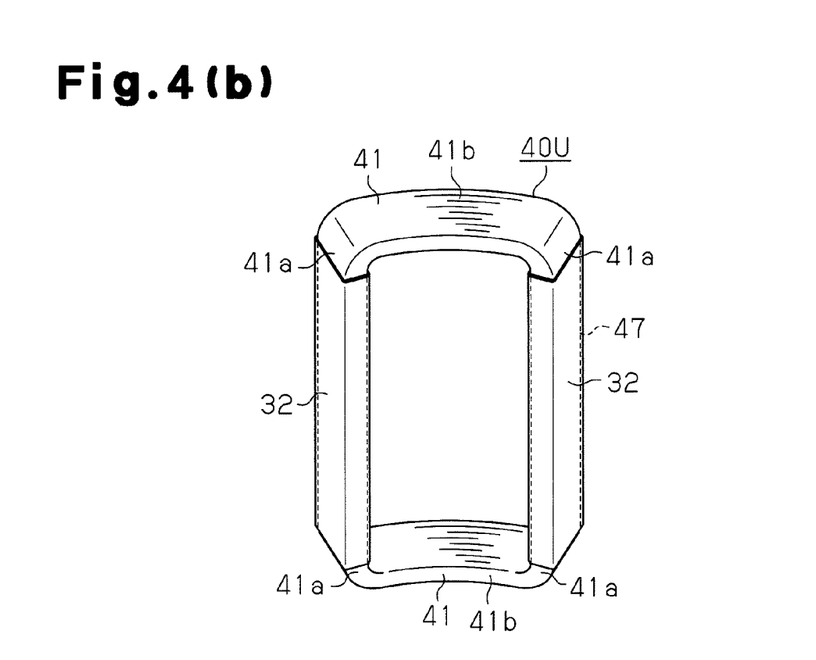
FIG. 4(b) is a perspective view showing an inner coil.

The pair of inner coils 40U is disposed at an angular distance of 180° from each other, and is inserted into a total of four slots 14. The inner coils 40V and the inner coils 40W are disposed also in the same manner. The inner coils 40U, 40V and 40W are coil wires (rectangular wires) having rectangular cross sections and uniform widths, and they are insulated and coated. As shown in FIG. 4(*b*), each of the inner coils 40U, 40V and 40W (only inner coil 40U is shown in FIG. 4(*b*)) includes a pair of inserting portions 47 inserted into the slots 14, and a pair of coil ends 41 (second coil ends) protruding from both end surfaces of the stator core 11 in its axial direction.

As shown in FIGS. 1 and 2, the coil end 41 (hereinafter, referred to as an inner coil end 41) of each of the inner coils 40U, 40V and 40W includes a pair of upright portions 41*a* extending from the inserting portions 47 along the axial direction of the stator core 11. The inner coil end 41 further includes an inner bridge portion 41*b* extending along the circumferential direction of the stator core 11 so as to connect distal ends of the pair of upright portions 41*a* with each other. Each of the inner coil ends 41 is formed by the pair of upright portions 41*a* and the pair of inner bridge portions 41*b* into a channel shape as viewed from the front. As shown in FIG. 4(*b*), an insulation sheet 32 made of synthetic resin is wound around each of the inserting portions 47.

In a state where the outer coils 30U, 30V and 30W and the inner coils 40U, 40V and 40W are assembled into the slots 14, the outer bridge portions 31b are disposed outside the inner bridge portions 41b in the radial direction of the stator core 11. In other words, the outer bridge portions 31b are disposed on the opposite side from the rotor 15 with respect to the inner bridge portions 41b. The outer bridge portions 31b are disposed on a first circumference around the center axis P of the stator core 11, and the inner bridge portions 41b are disposed on a second circumference located radially inside the first circumference. The inserting portions 37 and 47 of the outer and inner coils are disposed on the second circumference. Each of the inner bridge portions 41b extends across the bent portions 31a of two outer coils 30U that are adjacent to each other in the circumferential direction of the stator core 11. In a state where the inner coils 40U, 40V and 40W are assembled into the slots 14, teeth that are adjacent to the upright portions 41a between the pair of upright portions 41a of each of the inner coil ends 41 are the stationary teeth 12. Teeth sandwiched between the outer bridge portion 31b and the inner bridge portion 41b that partially overlaps the outer bridge portion 31b in the circumferential direction are the stationary teeth 12. The outer coils 30U, 30V and 30W are assembled into the stator core 11 prior to the inner coils 40U, 40V and 40W.

Next, a producing method of the stator 10 will be described.

Figure 5A:
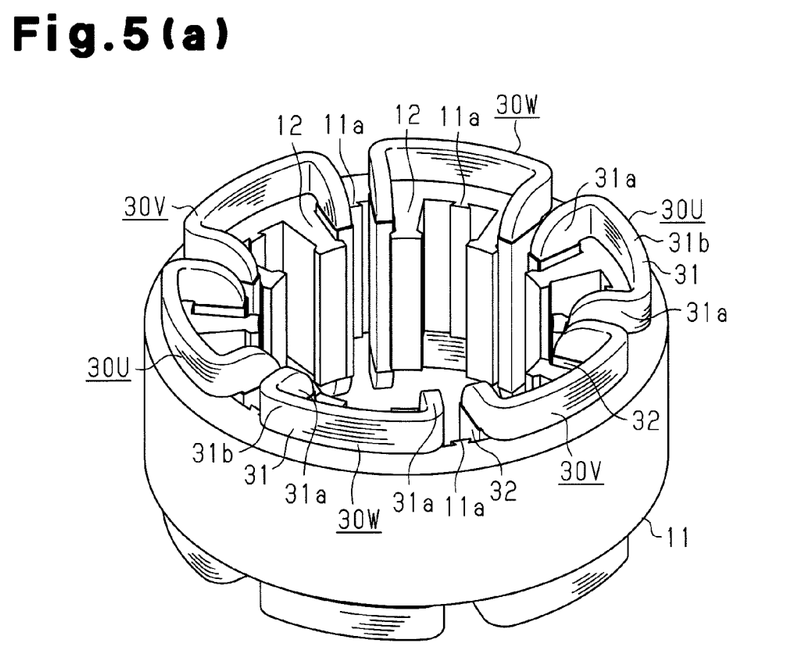
FIG. 5(a) is a perspective view showing a state where the outer coil is assembled into the stator core.

First, in a state where the split teeth 13 are detached from the stator core 11, as shown in FIG. 5(a), each of the outer coils 30U, 30V and 30W is assembled into the two (pair of) stationary teeth 12 that sandwich one engaging projection 11a. That is, each of the outer coils 30U, 30V and 30W is moved radially outward of the stator core 11. Each of the outer coils 30U, 30V and 30W is assembled into a pair of stationary teeth 12 such that the pair of stationary teeth 12 is disposed inside the outer coils 30U, 30V and 30W. The pairs of U-phase, V-phase and W-phase outer coils 30U, 30V and 30W are assembled into the stationary teeth 12 (stator core 11) such that they are disposed on the same circumference in the order of U-phase, V-phase and W-phase along the circumferential direction of the stator core 11.

In this assembled state, gaps into which split teeth 13 can be inserted are formed between the U-phase outer coil 30U and the V-phase outer coil 30V that are adjacent to each other in the circumferential direction, between the V-phase outer coil 30V and the W-phase outer coil 30W that are adjacent to each other in the circumferential direction, and between the W-phase outer coil 30W and the U-phase outer coil 30U that are adjacent to each other in the circumferential direction.

Figure 5B:
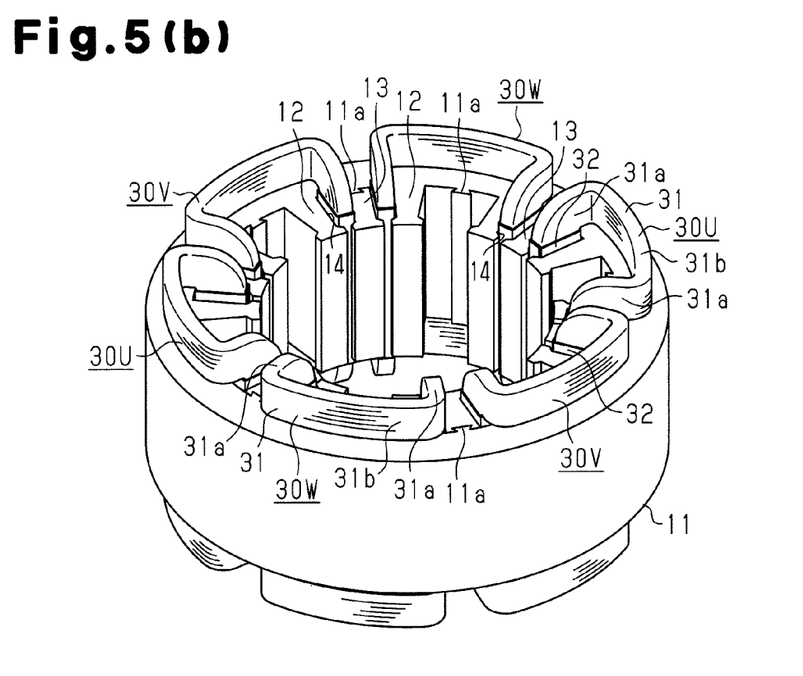
FIG. 5(b) is a perspective view showing a state where the split teeth are attached between outer coils.

Next, as shown in FIG. 5(b), the split teeth 13 are inserted into gaps each formed between two of the outer coils 30U, 30V and 30W that are adjacent to each other in the circumferential direction of the stator core 11, and the split teeth 13 are attached to the stator core 11. While moving the split teeth 13 along the axial direction of the stator core 11, the engaging recesses 13c of the split teeth 13 are fitted to the engaging projections 11a of the stator core 11, thereby attaching the split teeth 13 to the stator core 11.

Then, the slots 14 are defined between the stationary teeth 12 and the split teeth 13 that are adjacent to each other in the circumferential direction of the stator core 11. The inserting portions 37 of the outer coils 30U, 30V and 30W are inserted into the defined slots 14.

In a state where the outer coils 30U, 30V and 30W are assembled into the stator core 11, the bent portions 31a of the outer coil ends 31 extend from the inserting portions 37 (the slots 14) radially outward of the stator core 11. Hence, gaps are formed between the bent portions 31a of the outer coil ends 31 that are adjacent to each other in the circumferential direction, and the engaging projections 11a are opened in the axial direction of the stator core 11 in the gaps. That is, the bent portions 31a do not exist on extensions of the engaging projections 11a along the axial direction of the stator core 11. Hence, it is possible to insert the split teeth 13 between the two bent portions 31a that exist between the pair of stationary teeth 12 while moving the split teeth 13 along the axial direction of the stator core 11.

Figure 6A:
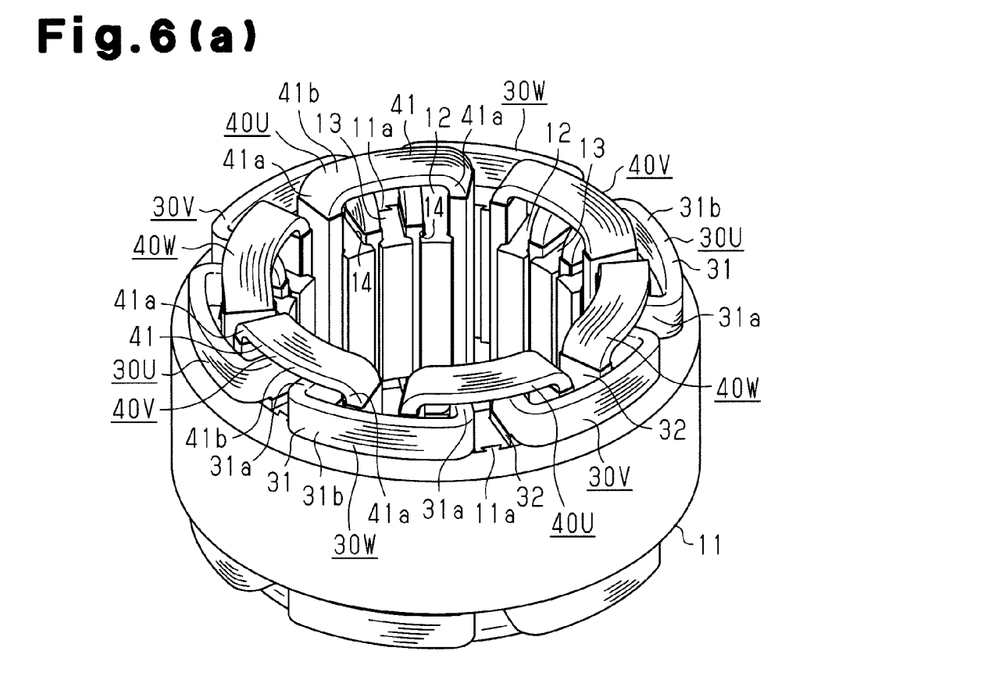
FIG. 6(a) is a perspective view showing a state where the inner coils are assembled.

Next, as shown in FIG. 6(a), each of the inner coils 40U, 40V and 40W is assembled into two (pair of) stationary teeth 12 that sandwich one split tooth 13. That is, each of the inner coils 40U, 40V and 40W is assembled into stationary tooth 12 across which the inner bridge portion 41b and the outer bridge portion 31b extend.

Each of the inner coils 40U, 40V and 40W is moved radially outward of the stator core 11 from an inner space of the stator core 11, and each of the inner coils 40U, 40V and 40W is assembled into a pair of stationary teeth 12 such that the same pair of stationary teeth 12 (and one split tooth 13 between the same pair of stationary teeth 12) are disposed inside the inner coils 40U, 40V and 40W. The outer bridge portion 31b is disposed radially outside the inner circumferential surface (this corresponds to the bottom of the slot 14) of the stator core 11, and a gap is formed between the pair of bent portions 31a on both ends of the outer bridge portion 31b. Hence, the outer bridge portions 31b do not hinder assembling of the inner coils 40U, 40V and 40W. According to the inner coils 40U, 40V and 40W, which are assembled in this manner, the inserting portions 37 are accommodated in the gaps between the stationary teeth 12; and each of the inner bridge portions 41b extends across two bent portions 31a, which are adjacent to each other in the circumferential direction of the stator core 11, and is disposed radially inside the outer bridge portion 31b.

The pairs of U-phase, V-phase and W-phase inner coils 40U, 40V and 40W are assembled into the stationary teeth 12 such that the inner coils 40U, 40V and 40W are disposed on the same circumference (in the same series) in the order of U-phase, V-phase and W-phase. In this assembled state, gaps into which the split teeth 13 can be inserted are formed between the U-phase inner coil 40U and the V-phase inner coil 40V that are adjacent to each other in the circumferential direction, between the V-phase inner coil 40V and the W-phase inner coil 40W that are adjacent to each other in the circumferential direction, and between the W-phase inner coil 40W and the U-phase inner coil 40U that are adjacent to each other in the circumferential direction.

Figure 6B:
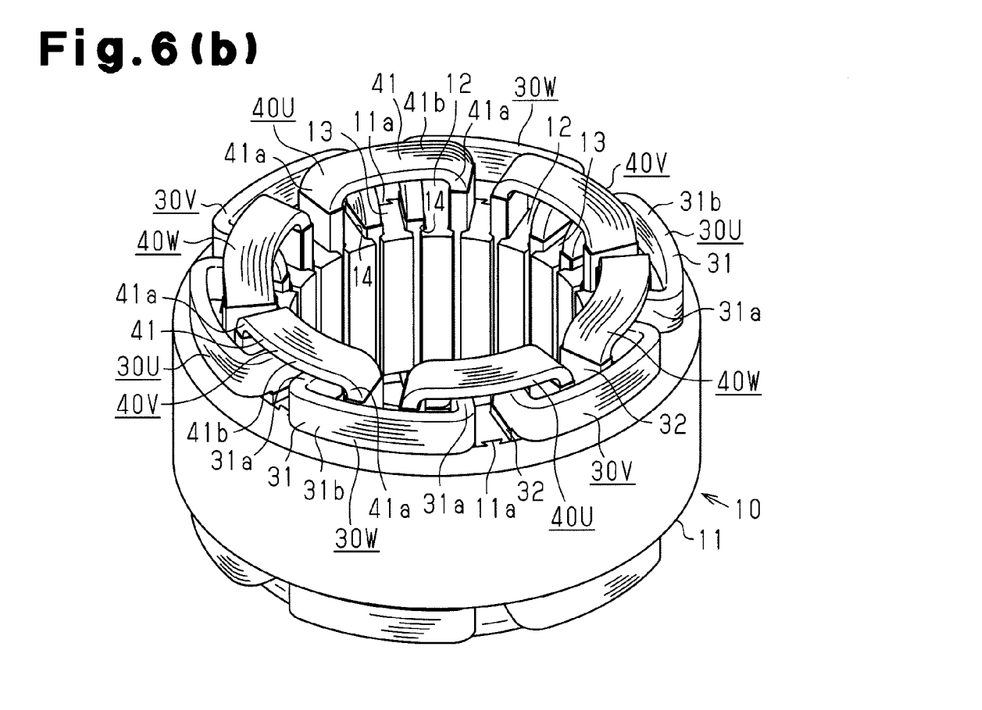
FIG. 6(b) is a perspective view showing a state where the split teeth are attached between the inner coils.

Next, as shown in FIG. 6(b), the split teeth 13 are inserted into gaps between two of the inner coils 40U, 40V and 40W that are adjacent to each other in the circumferential direction of the stator core 11, and the split teeth 13 are attached to the stator core 11. The outer bridge portions 31b are disposed radially outside the inner circumferential surface of the stator core 11, and are disposed radially outside the engaging projections 11a of the stator core 11. Gaps that are opened in the axial direction of the stator core 11 are formed between the two bent portions 31a disposed between the stationary teeth 12 that are adjacent to each other in the circumferential direction. Hence, the outer bridge portions 31b and the bent portions 31a do not hinder the insertion of the split teeth 13.

The split teeth 13 are attached to the stator core 11 such that the split teeth 13 and the stationary teeth 12 sandwich the inserting portions 47 of the inner coils 40U, 40V and 40W. The engaging recesses 13c of the split teeth 13 are fitted to the engaging projections 11a of the stator core 11 while moving the split teeth 13 along the axial direction of the stator core 11, thereby attaching the split teeth 13 to the stator core 11.

When the split teeth 13 are attached to the stator core 11, the slots 14 are defined between the stationary teeth 12 and the split teeth 13 that are adjacent to each other in the circumferential direction. The inserting portions 47 of the inner coils 40U, 40V and 40W are inserted into the slots 14.

Figure 7:
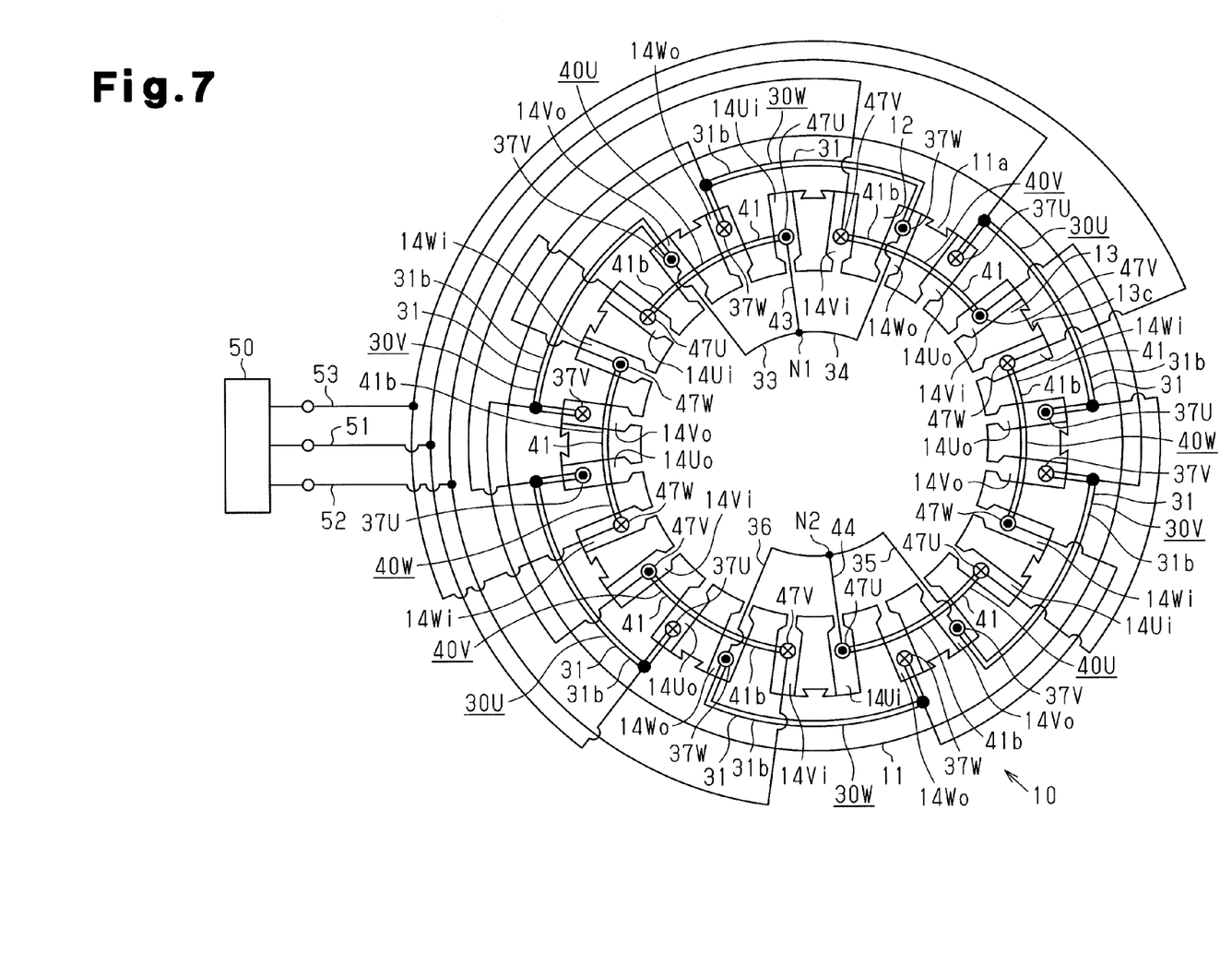
FIG. 7 is a wiring diagram of the outer coils and the inner coils.

FIG. 7 is a wiring diagram of the outer coils 30U, 30V and 30W and the inner coils 40U, 40V and 40W in the stator 10 produced by the above-described method. U-phase inserting portions (shown with 37U in FIG. 7 only) of a pair of outer coils 30U that are connected to a U-phase terminal 51 of an inverter 50 pass through a group of the U-phase slots (shown with 14Uo in FIG. 7 only). V-phase inserting portions (shown with 37V in FIG. 7 only) of a pair of outer coils 30V that are connected to a V-phase terminal 52 of the inverter 50 pass through a group of the V-phase slots (shown with 14Vo in FIG. 7 only). W-phase inserting portions (shown with 37W in FIG. 7 only) of a pair of outer coils 30W that are connected to a W-phase terminal 53 of the inverter 50 pass through a group of the W-phase slots (shown with 14Wo in FIG. 7 only).

U-phase inserting portions (shown with 47U in FIG. 7 only) of a pair of inner coils 40U that are connected to the U-phase terminal 51 of the inverter 50 pass through a group of the U-phase slots (shown with 14Ui in FIG. 7 only). V-phase inserting portions (shown with 47V in FIG. 7 only) of a pair of inner coils 40V that are connected to the V-phase terminal 52 of the inverter 50 pass through a group of the V-phase slots (shown with 14Vi in FIG. 7 only). W-phase inserting portions (shown with 47W in FIG. 7 only) of a pair of inner coils 40W that are connected to the W-phase terminal 53 of the inverter 50 pass through a group of the W-phase slots (shown with 14Wi in FIG. 7 only).

The U-phase outer coil 30U and the U-phase inner coil 40U are connected to each other in series. As the U-phase coils, the same number of first series of outer coils 30U and second series of inner coils 40U are used (two each). The V-phase outer coil 30V and the V-phase inner coil 40V are connected to each other in series. As the V-phase coils, the same number of first series of outer coils 30V and second series of inner coils 40V are used (two each). The W-phase outer coil 30W and the W-phase inner coil 40W are connected to each other in series. As the W-phase coils, the same number of first series of outer coils 30W and second series of inner coils 40W are used (two each).

A symbol N1 represents a neutral point that connects terminal ends of coil wires 33, 34 and 43 of the outer coils 30U, 30V and 30W and the inner coils 40U, 40V and 40W with each other, and a symbol N2 represents a neutral point that connects terminal ends of coil wires 35, 36 and 44 of the outer coils 30U, 30V and 30W and the inner coils 40U, 40V and 40W. The rotational electric machine M is an 8-pole 3-phase 24-slot rotational electric machine. The rotor 15 is rotated by energizing the outer coils 30U, 30V and 30W and the inner coils 40U, 40V and 40W through the inverter 50.

This embodiment has the following merits.

(1) Preformed U-phase, V-phase and W-phase outer coils 30U, 30V and 30W are used, and preformed U-phase, V-phase and W-phase inner coils 40U, 40V and 40W are used. The outer coils 30U, 30V and 30W are preformed such that their outer bridge portions 31b are disposed radially outside the inner bridge portions 41b of the inner coils 40U, 40V and 40W. Therefore, when the inner coils 40U, 40V and 40W are assembled into the stationary teeth 12 after the outer coils 30U, 30V and 30W are assembled into the stationary teeth 12, the coil ends 31 and 41 do not interfere with each other. Hence, even though the rotational electric machine has the coils of three phases, it is only necessary to form two kinds of coils, i.e., the outer coils 30U, 30V and 30W and the inner coils 40U, 40V and 40W, and the amount of work and the number of jigs required for forming the coils can be reduced, and the production costs for the stator 10 can be reduced as compared with a case where the coils of three phases are formed into different shapes.

(2) The outer bridge portions 31b (outer coil ends 31) of the U-phase, V-phase and W-phase outer coils 30U, 30V and 30W are disposed on one circumference formed around the center axis P of the stator core 11, and the outer coils 30U, 30V and 30W are disposed in the same series. The inner bridge portions 41b (inner coil ends 41) of the U-phase, V-phase and W-phase inner coils 40U, 40V and 40W are disposed on one circumference formed around the center axis P of the stator core 11, and the inner coils 40U, 40V and 40W are disposed in the same series. Therefore, the outer coil ends 31 and the inner coil ends 41 can be made small in size as compared with a case where the coil ends of coils of the three phases are disposed on different circumferences.

(3) As the coil ends, only two kinds of coil ends, i.e., the outer coil ends 31 and the inner coil ends 41 exist. Therefore, it is possible to reduce the lengths of the outer coil end 31 and the inner coil end 41 protruding from the end surface of the stator core 11 as compared with a case where the coil ends of coils of the three phases are formed into different shapes so that the coil ends do not interfere with each other.

(4) The U-phase outer coil 30U and the U-phase inner coil 40U are connected to each other in series, the V-phase outer coil 30V and the V-phase inner coil 40V are connected to each other in series, and the W-phase outer coil 30W and the W-phase inner coil 40W are connected to each other in series. The pairs of outer coils 30U, 30V and 30W are used, and the pairs of inner coils 40U, 40V and 40W are used. Therefore, the coil lengths of the phases can be made equal to each other, and variation in impedances of coils between the different phases can be reduced. As a result, a current imbalance is less likely to be generated, and it is possible to avoid inconvenience such as torque reduction, increase in loss and increase in vibration that may be caused by power concentration.

(5) The outer coils 30U, 30V and 30W are formed into the same shapes in the U-phase, V-phase and W-phase, and the inner coils 40U, 40V and 40W are also formed into the same shapes in the U-phase, V-phase and W-phase. Therefore, all of the outer coil ends 31 of the outer coils 30U, 30V and 30W disposed on the same circumference (same series) have the same shapes, and all of the inner coils 40U, 40V and 40W disposed on the same circumference (same series) also have the same shapes. Therefore, the coil lengths of the phases can be made equal to each other, and variation in impedances of coils between the different phases can be reduced. As a result, an unbalanced current is less likely to be generated, and it is possible to avoid inconvenience so as torque reduction, increase in loss and increase in vibration that may be caused by power concentration.

(6) The stator 10 includes the stationary teeth 12, which are integrally formed on the stator core 11, and the split teeth 13, which can be attached to and detached from the stator core 11. After the outer coils 30U, 30V and 30W are assembled into the stationary teeth 12, some of the split teeth 13 are attached to the stator core 11, thereby defining the slots 14. After the inner coils 40U, 40V and 40W are assembled into the stationary teeth 12, remaining split teeth 13 are attached to the stator core 11, thereby defining the slots 14. Therefore, even when the stator 10 of the distributed winding type is produced, it is unnecessary to deform the coils when assembling the outer coils 30U, 30V and 30W and the inner coils 40U, 40V and 40W into the slots 14. Also, it is possible to prevent the coil wires from being damaged, and it is possible to prevent performance of the rotational electric machine M from being deteriorated when the stator 10 is produced.

(7) Among all of the teeth, half of them are the stationary teeth 12. Therefore, as compared with a case where all of the teeth are the split teeth 13, it is possible to shorten time required for attaching all of the teeth to the stator core 11, to reduce the number of parts, and to reduce the production costs of the stator 10. Further, as compared with the case where all of the teeth are the split teeth 13, it is possible to reduce iron loss generated by gaps of the fitted portions of the split teeth 13 and the stator core 11, and to reduce variation in gaps between teeth that are adjacent to each other in the circumferential direction of the stator core 11. As a result, it is possible to prevent torque ripple from increasing. In addition, when all of the teeth are made as the split teeth 13, a plastic deformation amount generated when all of the split teeth 13 are attached to the stator core 11 is increased. In the case of this embodiment, however, only half of all of the teeth are the split teeth 13, it is possible to reduce the plastic deformation amount caused when the split teeth 13 are assembled, and to reduce the deterioration in electromagnetic characteristics.

The above-described embodiment may be modified as follows.

If the first series of outer coils 30U, 30V and 30W have such shapes that their outer bridge portions 31b are disposed radially outside (opposite side to the protruding direction of the stationary teeth 12) of the inner bridge portions 41b, the outer coils 30U, 30V and 30W are not necessarily formed into the same shapes. For example, the lengths of the coil wires may be different from one phase to another. The second series of inner coils 40U, 40V and 40W of the respective phases are not necessarily formed into the same shapes as long as the inner bridge portions 41b extend across the bent portion 31a, and the lengths or the like of the coil wires may be different from one phase to another. In this case, it is preferable that only the shapes of the inserting portions 37 of the outer coils 30U, 30V and 30W be different from each other, and it is preferable that only the shapes of the inserting portions 47 of the inner coils 40U, 40V and 40W be different from each other.

The first series of coils may be configured so that the series include a mixture of coils of at least two phases (U-phase and V-phase, V-phase and W-phase, or W-phase and U-phase), and the second series of coils may be configured so that the series include a mixture of coils of at least two phases (V-phase and W-phase, W-phase and U-phase, or U-phase and V-phase)

Figure 8:
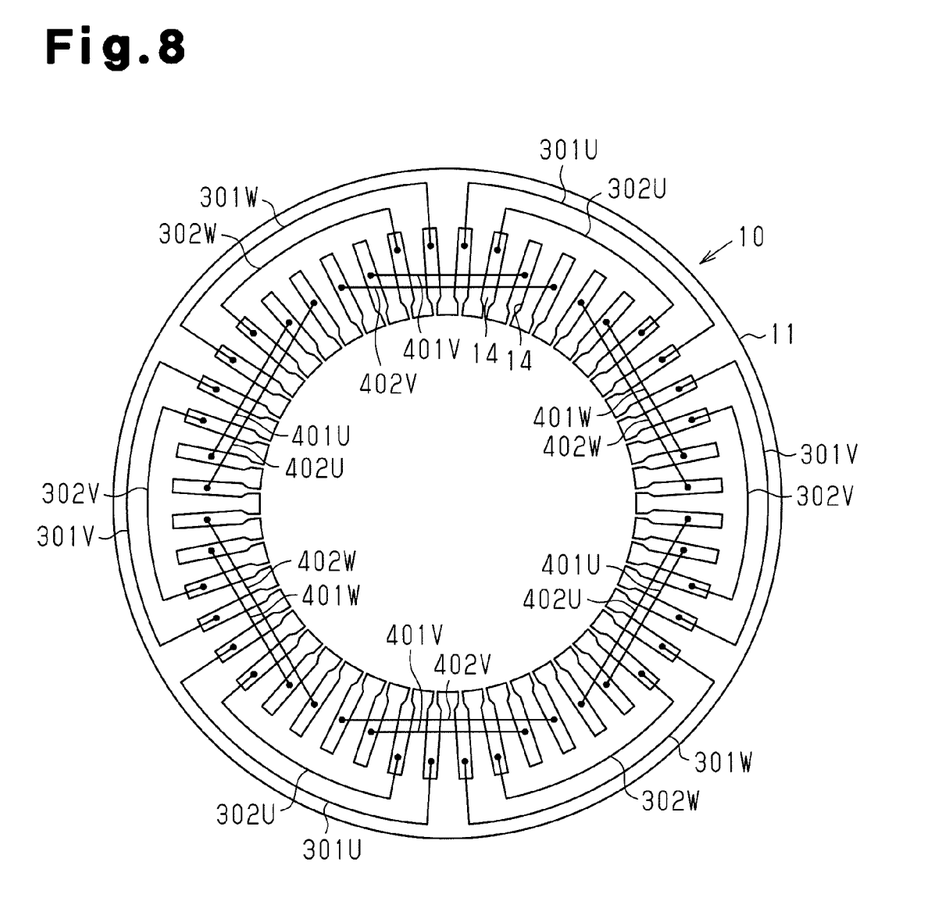
FIG. 8 is a schematic diagram showing a stator of a modification.

The combination between the number of poles and the number of slots may appropriately be changed if "the number of poles×the number of phases (3)=the number of slots". If the number of poles is "6", the number of slots will be eighteen since the number of phases is "3". Alternatively, the number of poles and the number of slots may appropriately be changed if "the number of poles×the number of phases (3)× the number of coils in one series=the number of slots". For example, as shown in FIG. 8, when the number of poles is "8" and the number of phases is "3" and there are two kinds of coils in each of the first series and the second series, the number of slots will be forty eight. In FIG. 8, the first series of coils are first outer coils 301U, 301V and 301W and second outer coils 302U, 302V and 302W, which are disposed inside the first outer coils 301U, 301V and 301W in the radial direction of the stator core 11. Further, second series of coils are first inner coils 401U, 401V and 401W and second inner coils 402U, 402V and 402W, which are disposed inside of the first inner coils 401U, 401V and 401W in the radial direction of the stator core 11.

All of the teeth may be the stationary teeth 12 or all of the teeth may be the split teeth 13.

As the electric machine, a stator of a straight type electric machine such as a linear motor may be formed as in the present invention. In the straight type electric machine, an outer coil (first series of coil) means a coil that is assembled into a stator core prior to an inner coil (second series of coil) and its bridge portion is disposed on a side opposite to a protruding direction of teeth as compared with a bridge portion of the inner coil, and an inner coil means a coil that is assembled into the stator core after the outer coil, and its bridge portion is disposed on a side of the protruding direction of the teeth as compared with the bridge portion of the outer coil.

EXPLANATION OF SYMBOLS

M . . . Rotational Electric Machine as Electric Machine, 10 . . . Stator, 11 . . . Stator Core, 12 . . . Stationary Tooth as Tooth, 13 . . . Split Tooth as Tooth, 14 . . . Slot, 30u, 30v, 30w, 301u, 301v, 301w, 302u, 302v, 302w . . . Outer Coil as First Series of Coil, 31 . . . Outer Coil End as First Series of Coil End, 31a . . . Bent Portion, 31b . . . Outer Bridge Portion, 37 . . . Inserting Portion of Outer Coil, 40u, 40v, 40w, 401u, 401v, 401w, 402u, 402v, 402w . . . Inner Coil as Second Series of Coil, 41 . . . Inner Coil End as Second Series Coil End, 41a . . . Upright Portion, 41b . . . Inner Bridge Portion, 47 . . . Inserting Portion of Inner Coil

The invention claimed is:

1. A stator for an electric machine, the stator comprising:
a stator core;
a plurality of teeth that extend into a first direction from the stator core and are arranged such that a slot is formed between adjacent teeth;
a first series of coils that are assembled into the slots and are formed into predetermined shapes; and
a second series of coils that are assembled into the slots and are formed into predetermined shapes, wherein
each of the first series of coils includes a pair of inserting portions respectively inserted into the slots, and a pair of first coil ends protruding from both end surfaces of the stator core, each of the first coil ends including a pair of bent portions extending from ends of the pair of inserting portions into a second direction that is opposite to the first direction, and a bridge portion that connects the bent portions with each other,
each of the second series of coils includes a pair of inserting portions respectively inserted into the slots, and a pair of second coil ends protruding from both end surfaces of the stator core, each of the second coil ends including a pair of upright portions extending from ends of the pair of inserting portions, and a bridge portion that connects the upright portions with each other,
the bridge portions of the first series of coils are disposed on the side toward the second direction with respect to the bridge portions of the second series of coils, the bridge portions of the second series of coils each extend across the bent portions of two adjacent first series of coils,
the first series of coils and the second series of coils are configured so that each series includes a mixture of coils of at least two phases among a U-phase, a V-phase and a W-phase, and each of the coils in the first series is connected to a coil of the same phase in the second series, and the teeth include a plurality of stationary teeth and split teeth, the stationary teeth being integrally formed on the stator core such that the first series of coils and the second series of coils can be assembled to the stationary teeth, and each split tooth attached to the stator core at a position between adjacent stationary teeth.

2. The stator according to claim 1, wherein
each coil in each phase in the first series is connected in series to a coil of the same phase in the second series, and
the number of coils of each phase in the first series is the same as the number of coils in the same phase in the second series.

3. The stator according to claim 1, wherein all of the first series of coils have the same shapes, and all of the second series of coils have the same shapes.

4. The stator according to claim 1, wherein half of all of the teeth are stationary teeth.

5. The stator according to claim 1, wherein the bridge portions of the first series of coils are disposed on the side toward the second direction with respect to the slots.

6. The stator according to claim 1, wherein
the stator core is cylindrical in shape,
the teeth are arranged along a circumferential direction of the stator core,
the teeth extend from an inner circumferential surface of the stator core into the first direction, and
the bridge portions of the first series of coils are disposed on the side toward the second direction of the stator core with respect to the slots.

7. The stator according to claim 6, wherein
the bridge portions of the first series of coils are disposed on a first circumference formed around a center axis of the stator core, and
the bridge portions of the second series of coils are disposed on a second circumference that is on the side toward the first direction with respect to the first circumference.

8. The stator according to claim 7, wherein the inserting portions of the first series of coils and the inserting portion of the second series of coils are disposed on the second circumference.

* * * * *